United States Patent
Kim et al.

(10) Patent No.: US 12,230,815 B2
(45) Date of Patent: Feb. 18, 2025

(54) ELECTROCHEMICAL CELL AND EXTERIOR MATERIAL PROVIDED THEREIN

(71) Applicant: LiBEST INC., Daejeon (KR)

(72) Inventors: Joo Seong Kim, Sejong-si (KR); Seung Gyu Lim, Daejeon (KR); Jin Hong Ha, Daejeon (KR); Gil Ju Lee, Daejeon (KR)

(73) Assignee: LiBEST INC., Daejeon (KR)

( * ) Notice: Subject to any disclaimer, the term of this patent is extended or adjusted under 35 U.S.C. 154(b) by 692 days.

(21) Appl. No.: 17/433,426

(22) PCT Filed: Jun. 17, 2020

(86) PCT No.: PCT/KR2020/007853
§ 371 (c)(1),
(2) Date: Aug. 24, 2021

(87) PCT Pub. No.: WO2020/256412
PCT Pub. Date: Dec. 24, 2020

(65) Prior Publication Data
US 2022/0052407 A1  Feb. 17, 2022

(30) Foreign Application Priority Data
Jun. 17, 2019 (KR) .................. 10-2019-0071669

(51) Int. Cl.
*H01M 50/184* (2021.01)
*H01M 10/0525* (2010.01)
(Continued)

(52) U.S. Cl.
CPC ..... *H01M 50/184* (2021.01); *H01M 10/0525* (2013.01); *H01M 10/058* (2013.01);
(Continued)

(58) Field of Classification Search
None
See application file for complete search history.

(56) References Cited

U.S. PATENT DOCUMENTS

| 10,658,632 B1* | 5/2020 | Zeng .................. H01M 50/159 |
| 2013/0101884 A1 | 4/2013 | Ueda |

(Continued)

FOREIGN PATENT DOCUMENTS

| CN | 107134546 A | 9/2017 |
| JP | 2000173559 A | 6/2000 |

(Continued)

OTHER PUBLICATIONS

International Search Report of PCT/KR2020/007853 dated Sep. 24, 2020.

(Continued)

*Primary Examiner* — Kevin M Bernatz
(74) *Attorney, Agent, or Firm* — HSML P.C.

(57) ABSTRACT

An electrochemical cell includes an electrode assembly including a plurality of electrodes; an exterior material including an accommodating part that accommodates the electrode assembly and a ealing part that seals the electrode assembly by bonding sealing surfaces along edges of the accommodating part; and an electrode lead connected to the electrode assembly and extended to be exposed to an outside, wherein the accommodating part includes a concavo-convex pattern extended in on one direction and disposed in a direction intersecting with the one direction, and at least a part of the concavo-convex pattern includes an adjacent portion that forms a boundary line in contact with the sealing part at an end portion in the one direction.

14 Claims, 7 Drawing Sheets

(51) Int. Cl.
    *H01M 10/058*     (2010.01)
    *H01M 50/105*     (2021.01)
    *H01M 50/126*     (2021.01)
    *H01M 50/136*     (2021.01)
    *H01M 50/172*     (2021.01)
    *H01M 50/531*     (2021.01)
    *H01M 50/543*     (2021.01)

(52) U.S. Cl.
    CPC ....... *H01M 50/105* (2021.01); *H01M 50/126* (2021.01); *H01M 50/136* (2021.01); *H01M 50/172* (2021.01); *H01M 50/531* (2021.01); *H01M 50/543* (2021.01); *H01M 2220/30* (2013.01)

(56) References Cited

U.S. PATENT DOCUMENTS

| | | | |
|---|---|---|---|
| 2015/0349375 A1 | 12/2015 | Takahashi et al. | |
| 2016/0093839 A1* | 3/2016 | Iseri | H01M 50/136 |
| | | | 429/127 |
| 2016/0226055 A1* | 8/2016 | Miyake | H01M 50/543 |
| 2017/0069881 A1* | 3/2017 | Kwon | H01M 50/129 |
| 2017/0250383 A1 | 8/2017 | Goto et al. | |
| 2023/0187742 A1* | 6/2023 | Kim | H01M 50/105 |
| | | | 429/163 |
| 2023/0198061 A1* | 6/2023 | Kim | H01M 10/049 |
| | | | 429/163 |
| 2023/0207930 A1* | 6/2023 | Kim | H01M 50/129 |

FOREIGN PATENT DOCUMENTS

| | | |
|---|---|---|
| JP | 5753258 B2 | 7/2015 |
| JP | 2015130332 A | 7/2015 |
| JP | 2016136508 A | 7/2016 |
| JP | 2017117776 A | 6/2017 |
| KR | 101294259 B1 | 8/2013 |
| KR | 1020160090108 A | 7/2016 |
| KR | 1020160100137 A | 8/2016 |
| KR | 1020160107022 A | 9/2016 |
| KR | 1020170101120 A | 9/2017 |
| KR | 101783703 B1 | 10/2017 |

OTHER PUBLICATIONS

Office Action issued in counterpart Chinese Application No. 202080017602.1, mailed Jan. 25, 2024, with machine translation.
The extended European search report issued in European Application No. 20826958.9, dated Jun. 26, 2023.

* cited by examiner

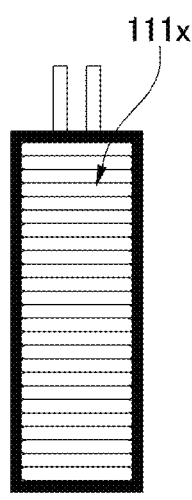
FIG. 10A
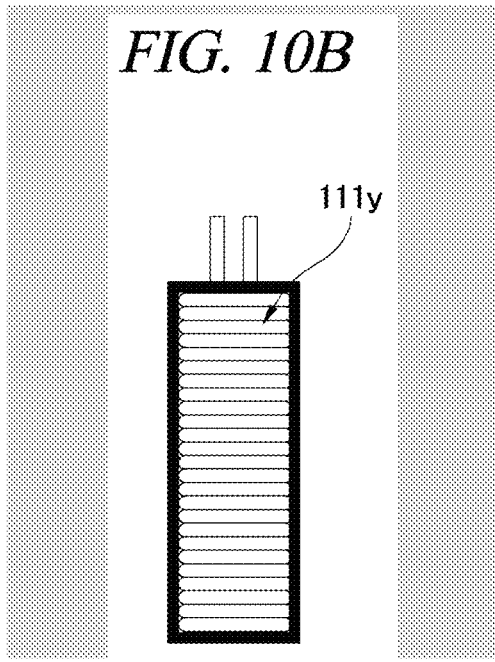
FIG. 10B  FIG. 10C
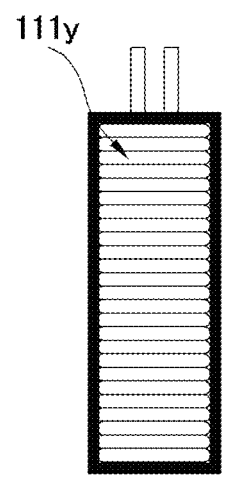
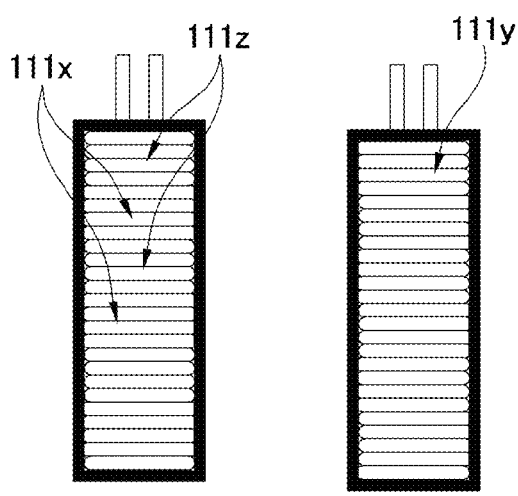
FIG. 10D  FIG. 10E

ELECTROCHEMICAL CELL AND EXTERIOR MATERIAL PROVIDED THEREIN

TECHNICAL FIELD

The present disclosure relates to an electrochemical cell which is chargeable and dischargeable and can be provided as a power source for a mobile or flexible device.

BACKGROUND

An electrochemical cell refers to an assembly that is composed of at least two electrodes and an electrolyte to provide electrical energy, and in particular, lithium-ion batteries configured as chargeable and dischargeable secondary cells are being widely used in various advanced electronic devices including smart phones.

Recently, various attempts have been made to deviate from conventional shapes in the design of mobile devices, including smartphones, and various wearable devices. Also, attention is increasing on flexible devices which can be bent while maintaining their functions. Accordingly, it is important to secure the function and safety of a flexible electrochemical cell which can be built in such a flexible device and can be used as a power source.

In this regard, Patent Document 1, which is a prior art, discloses a technique in which a pattern for imparting flexibility to an exterior material for sealing an electrode assembly is formed. However, Patent Document 1 discloses a structure of the pattern which is formed both in an area accommodating the electrode assembly and in a sealing area to secure sealing. Therefore, a sealing process requires an apparatus having a specific shape, or the pattern needs to be formed by pressing the exterior material in a sealed state. Thus, it may be difficult or expensive to manufacture the pattern in reality.

Further, Patent Document 2, which is a prior art, discloses a configuration in which a pattern is formed in an area accommodating an electrode assembly, but is not formed in a sealing area. However, when stress is concentrated at a boundary between the pattern formed by pressing an exterior material and the sealing area, cracks, breakages and the resultant leakage may occur intensively at the boundary. Patent Document 2 does not clearly describe the position or shape of the sealing area at the boundary.

(Patent Document 1) KR10-2016-0107022 A (published on Sep. 13, 2016)

(Patent Document 2) KR10-1783703 B1 (registered on Sep. 26, 2017)

DISCLOSURE OF THE INVENTION

Problems to be Solved by the Invention

An object of the present disclosure is to provide an exterior material configured to suppress cracks that may occur at a boundary between a repeated pattern area formed to improve flexibility and a sealing area formed for sealing, and an electrochemical cell.

Another object of the present disclosure is to provide a method of manufacturing an electrochemical cell configured to remove or reinforce a structure in which stress that may be generated in a forming a pattern for securing flexibility can be concentrated during formation of a sealing area.

Means for Solving the Problems

According to an exemplary embodiment, an electrochemical cell may include an electrode assembly including a plurality of electrodes; an exterior material including an accommodating part that accommodates the electrode assembly and a ealing part that seals the electrode assembly by bonding sealing surfaces along edges of the accommodating part; and an electrode lead connected to the electrode assembly and extended to be exposed to an outside, wherein the accommodating part includes a concavo-convex pattern extended in on one direction and disposed in a direction intersecting with the one direction, and at least a part of the concavo-convex pattern includes an adjacent portion that forms a boundary line in contact with the sealing part at an end portion in the one direction.

The sealing part may have a pattern having a lower height in a thickness direction than the concavo-convex pattern.

The concavo-convex pattern may further include a round portion having a predetermined radius of curvature at each of both end portions of the adjacent portion.

The concavo-convex pattern may further include a portion, of which a width is tapered in the one direction, at both end portions of the adjacent portion.

Wherein a difference (Wp=Rp−d) between the radius of curvature (Rp) and a length (d) of the round portion in the one direction may satisfie Equation 1:

$$Rp/2 \leq Wp \leq 2Rp. \qquad \text{[Equation 1]}$$

A difference (Wp=Rp−d) between a half (Rp) of the width of the concavo-convex pattern and a length (d) of the portion, of which the width is tapered in the one direction, may satisfie Equation 1:

$$Rp/2 \leq Wp \leq 2Rp. \qquad \text{[Equation 1]}$$

The sealing part may include an overlap area that is formed by being protruded and recessed when the concavo-convex pattern is formed and then bonding the sealing surfaces.

A width (Ws) of the sealing part and a width (Wp) of the overlap area in the one direction may satisfy Equations 2 and 3:

$$Ws - Wp \geq 1 \text{ mm} \qquad \text{[Equation 2]}$$

$$Wp \geq 0.1 \text{ mm.} \qquad \text{[Equation 3]}$$

The concavo-convex pattern may include a first pattern group having the adjacent portion at both end portions or at one end portion in the one direction and a second pattern group not having the adjacent portion.

The concavo-convex pattern may include a concave pattern that is formed to be protruded toward an inner space of the accommodating part and a convex pattern that is disposed adjacent to the concave pattern, has a different thickness from the concave pattern in the direction intersecting with the one direction and is protruded in a direction opposite to the concave pattern.

According to another exemplary embodiment, a method of manufacturing an electrochemical cell including an electrode assembly sealed within an exterior material, may include forming a concavo-convex pattern, which is extended in one direction and repeated in a direction intersecting with the one direction, in the exterior material; and forming a sealing part by overlapping and bonding two sealing surfaces of the exterior material, wherein in the forming the sealing part, an overlap area, which is a part of the concavo-convex pattern, is coupled to overlap with the sealing part.

In the forming the concavo-convex pattern, a round portion having a predetermined radius of curvature (Rp) may be formed at an end portion of the concavo-convex pattern in the one direction, and in the forming the sealing part, at least a part of the round portion is included in the overlap area, and a width (Wp) of the overlap area in the one direction satisfies Equation 1:

$$Rp/2 \leq Wp \leq 2Rp. \qquad \text{[Equation 1]}$$

In the forming the concavo-convex pattern, a portion, of which a width (2Rp) is tapered in the one direction, may be formed in the one direction at end portions of the concavo-convex pattern, in the forming the sealing part, at least a part of the portion, of which the width is tapered, is included in the overlap area, and a width (Wp) of the overlap area in the one direction satisfies Equation 1:

$$Rp/2 \leq Wp \leq 2Rp. \qquad \text{[Equation 1]}$$

A width (Ws) of the sealing part and a width (Wp) of the overlap area in the one direction may satisfy Equations 2 and 3:

$$Ws - Wp \geq 1 \text{ mm} \qquad \text{[Equation 2]}$$

$$Wp \geq 0.1 \text{ mm}. \qquad \text{[Equation 3]}$$

According to another exemplary embodiment, an exterior material that seals an electrode assembly, may include an accommodating part that accommodates the electrode assembly and includes a concavo-convex pattern extended in on one direction and disposed in a direction intersecting with the one direction; and a sealing part that is formed by bonding two sealing surfaces along edges of the accommodating part, wherein at least a part of the concavo-convex pattern includes an adjacent portion that forms a boundary line in contact with the sealing part at an end portion in the one direction.

Effects of the Invention

In the present disclosure, an electrochemical cell and an exterior material provided therein are formed such that a concavo-convex pattern of an accommodating part is in close contact with a sealing part. Therefore, it is possible to suppress formation of a space in which stress can be concentrated between the concavo-convex pattern and the sealing part. Accordingly, it is possible to greatly reduce the possibility of damaging an end portion in one direction of the concavo-convex pattern or the sealing part in a usage environment where repeated bending occurs. Further, the electrochemical cell and the exterior material according to the present disclosure can be improved in durability, and safety concerns caused by damage and leakage can be eliminated.

In a method of manufacturing an electrochemical cell according to the present disclosure, a sealing part including an overlap area processed together when forming a concavo-convex pattern is bonded, and, thus, the concavo-convex pattern and the sealing part can be formed to be in contact with each other. Therefore, it is possible to suppress concentration of stress caused by bending between an end portion of the concavo-convex pattern and the sealing part. In particular, it is possible to exclude a vulnerable part to bending without adding cost and processes such as adding a separate material or reinforcing an exterior material.

BRIEF DESCRIPTION OF THE DRAWINGS

FIG. 10 is a plan view showing electrochemical cells according to other embodiments of the present disclosure.

BEST MODE FOR CARRYING OUT THE INVENTION

Figure 1:
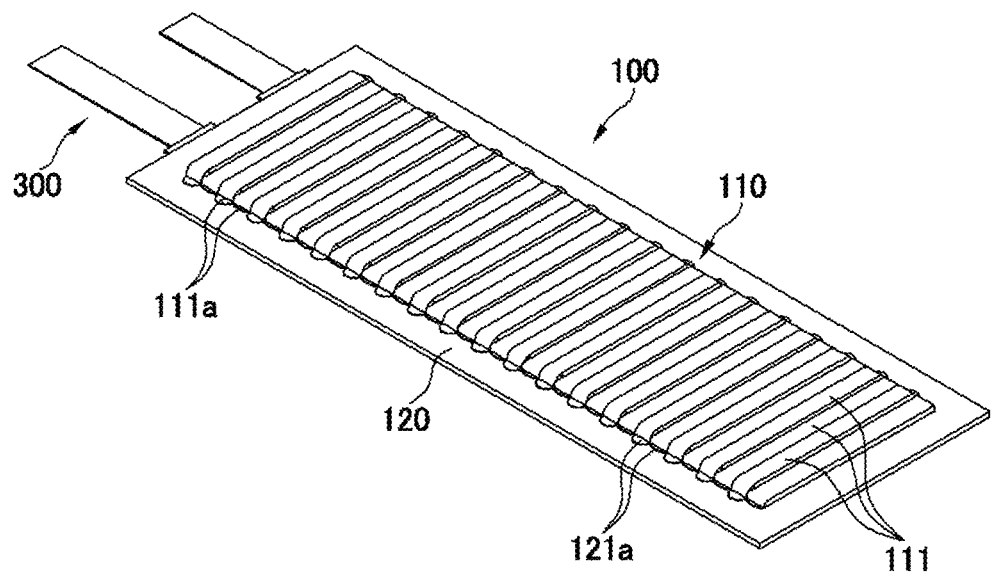
FIG. 1 is a perspective view showing an electrochemical cell according to an embodiment of the present disclosure.

Hereinafter, embodiments will be described in detail with reference to the accompanying drawings so that the present disclosure may be readily implemented by a person with ordinary skill in the art. However, it is to be noted that the present disclosure is not limited to the embodiments but can be embodied in various other ways. In the drawings, parts irrelevant to the description are omitted for the simplicity of explanation, and like reference numerals denote like parts through the whole document.

Through the whole document, the term "comprises or includes" and/or "comprising or including" used in the document means that one or more other components, steps, operation and/or existence or addition of elements are not excluded in addition to the described components, steps, operation and/or elements unless context dictates otherwise. Further, throughout this document, the term "connected to" may be used to designate a connection or coupling of one element to another element and includes an element being connected to another element via still another element and an element being electronically connected to another element via still another element as well as an element being directly connected to another element. Furthermore, through the whole document, the term "on" that is used to designate a position of one element with respect to another element includes both a case that the one element is adjacent to the other element and a case that any other element exists between these two elements.

An electrochemical cell according to the present disclosure may be a lithium-ion battery. Specifically, the electrochemical cell according to the present disclosure may be configured such that an electrode assembly is accommodated and sealed with an electrolyte within an exterior material, and charged and discharged by movement of lithium ions. The electrochemical cell according to the present disclosure may be configured to be bent with flexibility while maintaining its function. Hereinafter, embodiments of the present disclosure will be described in detail with reference to the accompanying drawings.

Figure 2:
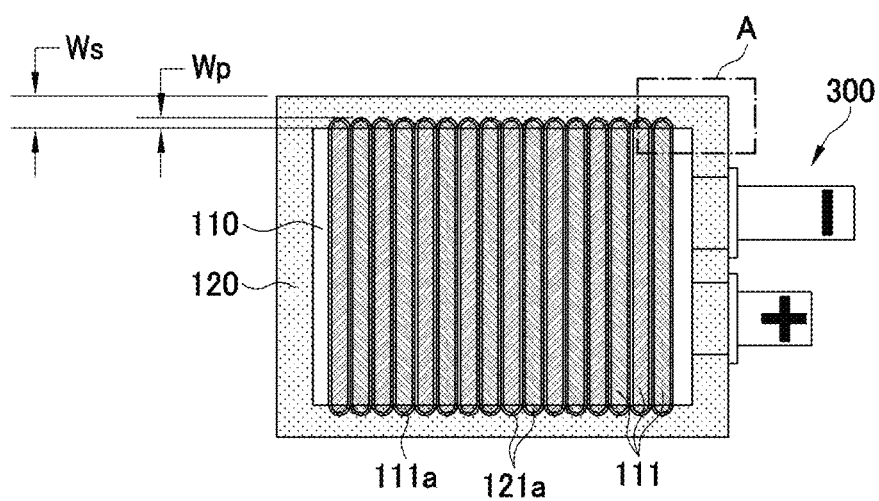
FIG. 2 is a plan view showing an exterior material and an electrode lead of the electrochemical cell according to an embodiment of the present disclosure.
Figure 3:
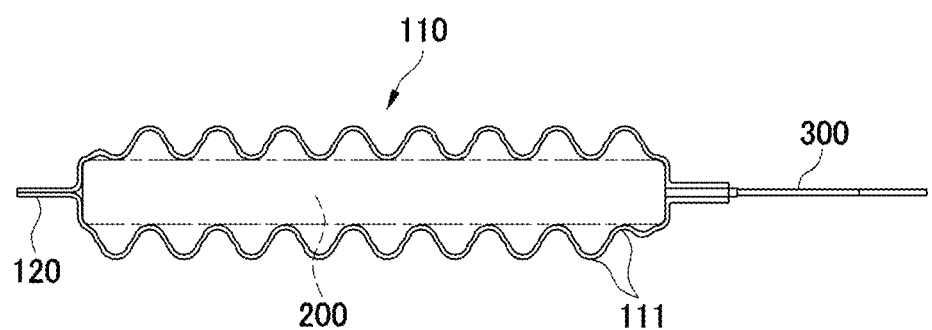
FIG. 3 is a cross-sectional view showing the exterior material and the electrode lead of the electrochemical cell shown in FIG. 2.
Figure 4:
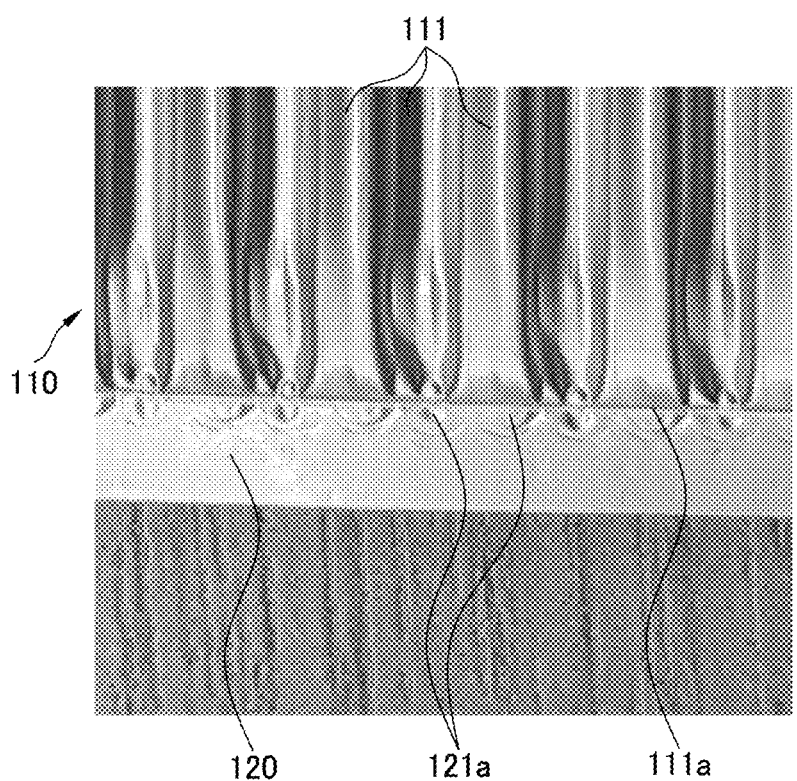
FIG. 4 is an enlarged view of an end portion of a concavo-convex pattern of the electrochemical cell according to an embodiment of the present disclosure.
Figure 5:
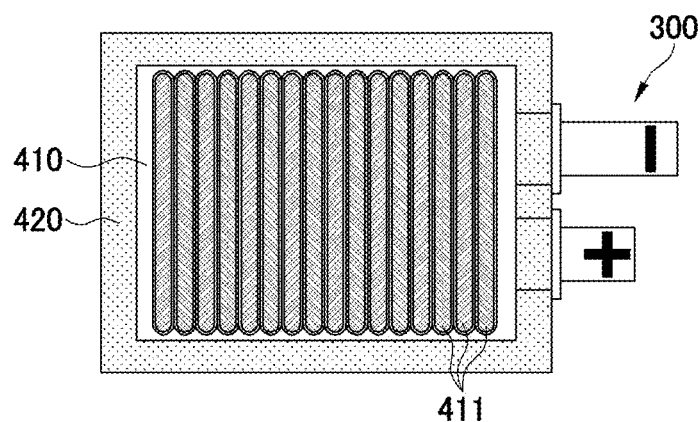
FIG. 5 is a plan view showing an exterior material and an electrode lead of a conventional electrochemical cell for comparison with the exterior material shown in FIG. 2.
Figure 6:
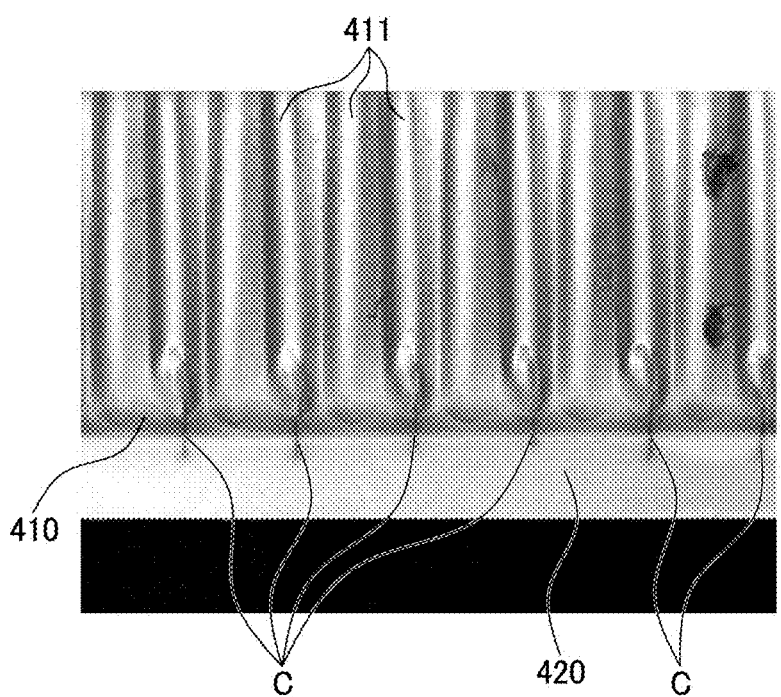
FIG. 6 shows cracks generated during repeated bending of a conventional electrochemical cell designed as shown in FIG. 5.

FIG. 1 is a perspective view showing an electrochemical cell 10 according to an embodiment of the present disclosure. FIG. 2 is a plan view showing an exterior material 100 and an electrode lead 300 of the electrochemical cell 10 according to an embodiment of the present disclosure, and FIG. 3 is a cross-sectional view showing the exterior material 100 and the electrode lead 300 of the electrochemical cell 10 shown in FIG. 2. FIG. 4 is an enlarged view of an end portion of a concavo-convex pattern 111 of the electrochemical cell 10 according to an embodiment of the present disclosure. Further, FIG. 5 is a plan view showing an exterior material 400 and the electrode lead 300 of a conventional electrochemical cell for comparison with the exterior material 100 shown in FIG. 2, and FIG. 6 shows cracks C generated during repeated bending of a conventional electrochemical cell designed as shown in FIG. 5.

Referring to FIG. 1 to FIG. 4, the electrochemical cell 10 according to an embodiment of the present disclosure includes the exterior material 100, an electrode assembly 200 and the electrode lead 300. The electrode assembly 200 includes a plurality of electrodes and may further include an active material and a separator, and may have a structure in which they are stacked in a thickness direction.

The electrodes may include first and second electrode plates having different polarities, and an active material may be coated on both surfaces or one surface of each of the first and second electrode plates. A separator may be interposed between the first electrode plate and the second electrode plate. For example, in the first electrode plate, a current collector used as a negative electrode is made of copper, aluminum, etc., and one or a combination of carbon, lithium, silicon, silicon derivatives, such as $SiO_x$, silicon-graphite composite, tin and silicon-tin composite. Also, in the second electrode plate, a current collector used as a positive electrode is made of aluminum, stainless steel, etc., and one or a combination of lithium cobalt oxide, lithium nickel oxide, lithium manganese oxide, lithium cobalt-manganese oxide, lithium cobalt-nickel oxide, lithium manganese-nickel oxide, lithium cobalt-nickel-manganese oxide, lithium cobalt-nickel-aluminum oxide and lithium iron phosphate. The electrode assembly 200 has a shape having a small thickness in the thickness direction in which the active material and the separator are stacked, and the active material extends longer in a longitudinal direction than in a width direction among two directions in which the first and second electrode plates extend to form a surface, and intersects with (for example, orthogonal to) the directions in which the surface is formed.

Further, the electrode assembly 200 may include electrode connection tabs and lead connection tabs. The electrode connection tabs may be formed to protrude from one ends of the first and second electrode plates in the longitudinal direction, and electrode connection tabs protruding from electrodes having the same polarity may be coupled to each other. The electrodes may be electrically connected in parallel by the electrode connection tabs. The lead connection tabs are connected to the electrode lead 300, and may protrude from the electrode plates of the negative electrode and the positive electrode so as to be coupled to the electrode lead 300.

The exterior material 100 according to an embodiment of the present disclosure is formed to accommodate the electrode assembly 200. The exterior material 100 may be formed as a film having a stacked structure including, for example, polypropylene (PP), metal and nylon layers.

Specifically, the exterior material 100 includes an accommodating part 110 and a sealing part 120. The accommodating part 110 may form a space for accommodating the electrode assembly 200, and the sealing part 120 may be bonded to seal the accommodated electrode assembly 200 from the outside. As shown in FIG. 3, the accommodating part 110 may correspond to an area of the two exterior materials 100 that face each other while being spaced apart from each other. In order to form the accommodating part 110, the exterior material 100 may be processed to be pressed and protruded in the thickness direction so that a predetermined area of the exterior material 100 has a substantially rectangular bowl (or cup) shape.

More specifically, the accommodating part 110 of the present embodiment may have the concavo-convex pattern 111. The concavo-convex pattern 111 extends in one direction and is repeatedly disposed in a direction intersecting with the one direction. Specifically, the concavo-convex pattern 111 is protruded and recessed alternately in the thickness direction (i.e., protruded alternately in opposite directions) so as to have a concavo-convex shape along the one direction. Here, the one direction may be the above-described width direction, and the direction in which the concavo-convex pattern 111 is repeated may be the longitudinal direction. Due to the protruded and recessed concavo-convex pattern 111, the exterior material 100 forming the accommodating part 110 may have a wave or crease pattern in the longitudinal direction as shown in FIG. 3.

The sealing part 120 is formed by bonding two sealing surfaces. The sealing surfaces refer to the surfaces of the exterior material 100. The two sealing surfaces overlapping along edges of the accommodating part 110 are bonded to each other so that an inner space (the accommodating part 110) can be isolated from the outside. The electrode assembly 200 and the electrolyte described above may be accommodated in the inner space, and the electrode assembly 200 and the electrolyte may be kept in a sealed state.

Further, the sealing part 120 may have a flat plate shape extending in the width direction or the longitudinal direction. For example, the flat plate shape of the sealing part 120 may be not bent so that its surfaces do not face each other. Alternatively, the sealing part 120 may have a pattern different from the concavo-convex pattern 111. For example, the sealing part 120 may have a pattern having a lower height in the thickness direction than the concavo-convex pattern 111.

Meanwhile, the electrode lead 300 is connected to the electrode assembly 200 inside the exterior material 100 and extended to be exposed to the outside of the exterior material 100. The electrode lead 300 functions as a terminal for electrical connection with the electrode assembly 200 accommodated in the exterior material 100, and when the sealing part 120 is formed, the electrode lead 300 may be bonded as being interposed between the sealing surfaces so as to penetrate the sealing part 120. A pair of electrode leads 300 of the positive electrode and the negative electrode may be coupled to the same poles of the lead connection tabs provided in the electrode assembly 200.

Hereinafter, the relationship between the positions and shapes of the concavo-convex pattern 111 and the sealing part 120 in the exterior material 100 according to an embodiment of the present disclosure will be described.

An end portion of the concavo-convex pattern 111 formed in the exterior material 100 according to the present embodiment includes an adjacent portion 111a in contact with the sealing part 120. The adjacent portion 111a may include a boundary line between the concavo-convex pattern 111 and the sealing part 120. That is, as shown in FIG. 2, the adjacent portion 111a may include two points of each concavo-convex pattern 111 that are in contact with the sealing part 120 and a boundary line extending between the two points. The boundary line of the adjacent portion 111a may extend in a substantially straight line along the sealing part 120 having a flat plate shape, and may be connected to the boundary line of the adjacent portion 111a of a neighboring concavo-convex pattern 111 so as to extend as a single line.

Unlike FIG. 2 showing the concavo-convex pattern 111 according to the present embodiment, FIG. 5 shows that the exterior material 400 has a concavo-convex pattern 411 formed inside an accommodating part 410. Thus, a sealing part 420 and the concavo-convex pattern 411 are spaced apart from each other. When an end portion of the sealing part 420 and the concavo-convex pattern 411 are spaced apart from each other as shown in FIG. 5, cracks C may easily occur due to repeated bending or the like. Specifically, as shown in FIG. 6, the cracks C may be developed toward the sealing part 420 at each end portion of a concave pattern of the concavo-convex pattern 411.

As shown in FIG. 2 and FIG. 4, the exterior material 100 according to an embodiment of the present disclosure is formed so that the concavo-convex pattern 111 of the accommodating part 110 and the sealing part 120 are in close contact with each other. Accordingly, a space between the concavo-convex pattern 411 and the sealing part 420 in which stress can be concentrated as shown in FIG. 5 and FIG. 6 is not formed in the present embodiment. By removing the structurally weak part, it is possible to greatly reduce the possibility of damaging an end portion in one direction of the concavo-convex pattern or the sealing part 120 in a usage environment where repeated bending occurs. Accordingly, the electrochemical cell 10 and the exterior material 100 according to the present disclosure can be improved in durability without further reinforcing or adding materials, and can be improved in safety due to a lower likelihood of damage and leakage.

Figure 7:
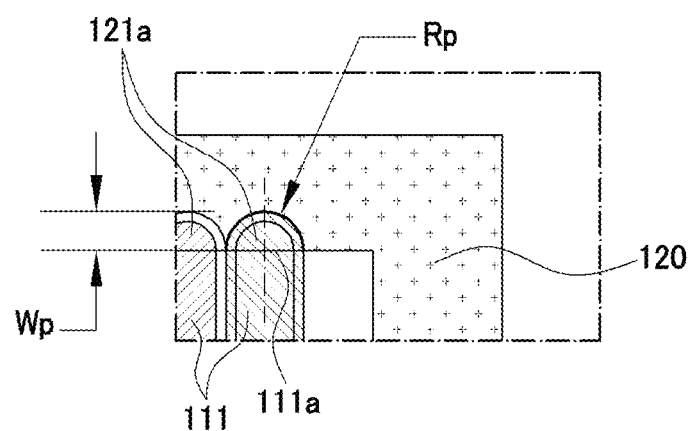
FIG. 7 is an enlarged view of an area A shown in FIG. 2.
Figure 8:
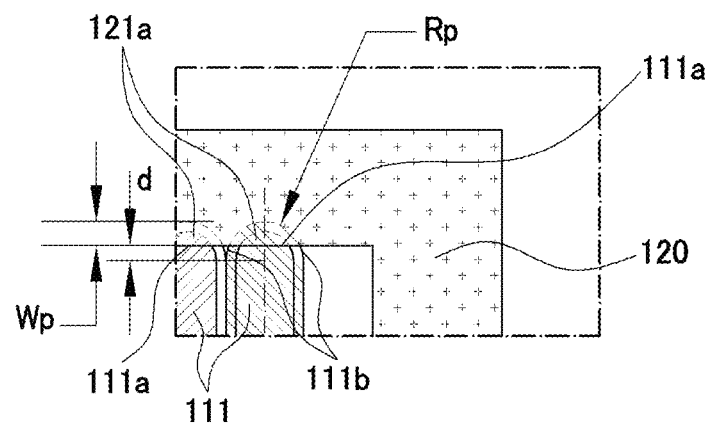
FIG. 8 shows another example of an overlap area formed in the present disclosure shown in FIG. 7.

FIG. 7 is an enlarged view of an area A shown in FIG. 2, and FIG. 8 shows another example of an overlap area 121a formed in the present disclosure shown in FIG. 7. Hereinafter, the concavo-convex pattern 111 and the sealing part 120 adjacent to each other will be described in more detail with further reference to FIG. 7 and FIG. 8.

Referring to FIG. 2 and FIG. 8, the concavo-convex pattern 111 may further include a round portion 111b. The round portion 111b may be connected to both end portions of the adjacent portion 111a and may have a preset radius of curvature. The round portion 111b may be formed at both end portions of the concavo-convex pattern 111 in one direction, and in the round portion 111b, the width of the concavo-convex pattern 111 at both end portions of the concavo-convex pattern 111 in the one direction (the width in a direction intersecting with the one direction, for example, the width in the left-right direction in FIG. 2, FIG. 5, FIG. 7 and FIG. 8) may be tapered in the one direction.

In connection with the formation of the round portion 111b, the sealing part 120 may include an overlap area 121a. The overlap area 121a may be formed by being protruded and recessed when the concavo-convex pattern 111 is formed and then bonding two sealing surfaces. That is, the overlap area 121a may be processed to be protruded or recessed in the thickness direction of the exterior material 100 when the concavo-convex pattern 111 (round portion 111b) is formed and then, the overlap area 121a may be pressed to be flat again when the sealing part 120 is formed so that the two sealing surfaces can be bonded to each other.

Further, the overlap area 121a may have an arc-shaped crease connected to the round portion 111b of the concavo-convex pattern 111. The adjacent portion 111a in a straight line connecting two points may be positioned between the overlap area 121a and each concavo-convex pattern 111. However, as shown in FIG. 8, the overlap area 121a according to the present disclosure may be an area in which almost no trace remains after the sealing part 120 is formed. Depending on the extent to which traces of the overlap area 121a remain, the sealing part 120 may have a flat plate shape, or the sealing part 120 or the overlap area 121a may have a pattern or crease having a lower height than the concavo-convex pattern 111.

Meanwhile, a width Wp of the overlap area 121a and a radius of curvature Rp of the round portion 111b may be designed to satisfy an equation of $Rp/2 \leq Wp \leq 2Rp$. Here, the width Wp of the overlap area 121a is based on one direction (width direction) and may be equal to a difference (Rp−d) between the radius of curvature Rp and a length d of the round portion 111b in the one direction (Wp=Rp−d). In an embodiment shown in FIG. 7, the relational expression of Wp=Rp is satisfied, and in another example shown in FIG. 8, a relational expression of Wp≤Rp is satisfied. As shown in FIG. 7 and FIG. 8, the radius of curvature Rp may be equal to a half (½) of the width of the concavo-convex pattern 111.

Referring to FIG. 2, a width Ws of the sealing part 120 and the width Wp of the overlap area 121a based on the one direction (width direction) are designed to satisfy relational expressions of Ws−Wp≥1 mm and Wp≥0.1 mm. That is, since the width Wp of the overlap area 121a is secured to be equal to or greater than a predetermined value, the concavo-convex pattern 111 can be sufficiently pressed to the sealing part 120. Also, since an area with a width corresponding to a width obtained by subtracting the width Wp of the overlap area 121a from the width Ws of the entire sealing part 120 is secured to be equal to or greater than a predetermined value, an area for sealing can be secured.

Figure 9A:
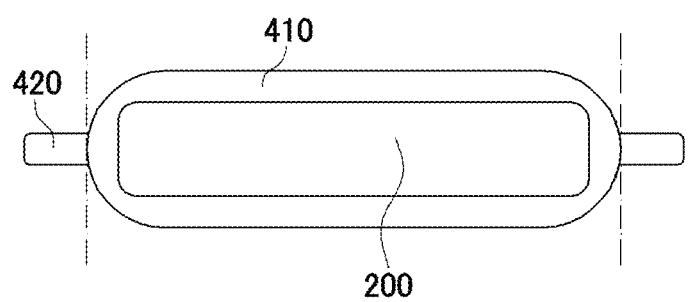
FIG. 9 is a view showing a cross-sectional shape of a conventional electrochemical cell compared to a cross-sectional shape of the electrochemical cell according to an embodiment of the present disclosure shown in FIG. 1.
Figure 9B:
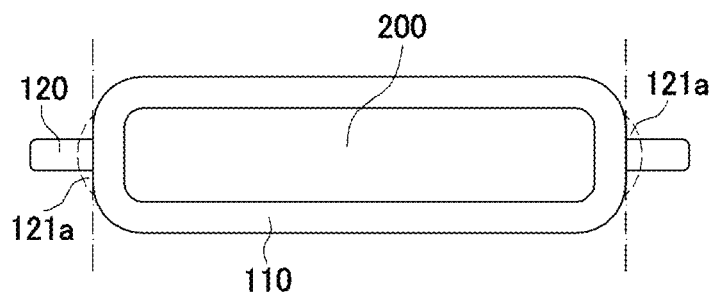

FIG. 9 is a view showing a cross-sectional shape of a conventional electrochemical cell compared to a cross-sectional shape of the electrochemical cell 10 according to an embodiment of the present disclosure shown in FIG. 1.

Referring to FIG. 9, it can be seen that when the concavo-convex pattern 111 according to an embodiment of the present disclosure is in contact with the sealing part 120 (b) compared to a case where the concavo-convex pattern 411 formed in the accommodating part 410 and the sealing part 420 are spaced apart from each other (a), the space of the accommodating part 110 filled with the electrode assembly 200 and the electrolyte can be secured wider. That is, the concavo-convex pattern 111 is formed longer in the one direction (width direction) than in the conventional case. As a result, the exterior material 100 forming the accommodating part 110 has a shape that is more sharply expanded at the boundary of the sealing part 120 in the thickness direction. Thus, the inner space can be formed wide.

The additionally secured space may be further filled with an electrolyte than in the conventional case. Therefore, due to the expansion of the inner space, the flexibility of the electrochemical cell 10 can be improved by adjusting the amount of electrolyte relative to the space. Also, since the inner space that can be filled with a gas which can be generated at the time of accumulation of charge/discharge cycles of the electrochemical cell 10 is further secured, it is possible to suppress swelling or volume increase of the electrochemical cell. By suppressing volume increase as such, the electrochemical cell 10 according to the present disclosure can satisfy the requirements that the electrochemical cell 10 functions in a narrow space such as a wearable device.

FIG. 10 is a plan view showing electrochemical cells according to other embodiments of the present disclosure. Hereinafter, various embodiments in which the adjacent portion 111a is formed at a part of the concavo-convex pattern 111 will be described with reference to FIG. 10.

The concavo-convex pattern 111 according to other embodiments of the present disclosure may include a first pattern group 111x and 111y having an adjacent portion 111a at both end portions or at one end portion in the one direction (width direction). FIG. 10A shows an embodiment in which both end portions of all the concavo-convex patterns 111 come into contact with the sealing part 120 to form an adjacent portion 111a, and the concavo-convex pattern 111 may include a first pattern group 111x having adjacent portions 111a at both end portions. FIG. 10B and FIG. 10C show an embodiment in which an adjacent portion 111a is formed only on one side of the one direction, and the concavo-convex pattern 111 may include a first pattern group 111y having an adjacent portion 111a at one end portion.

Further, the concavo-convex pattern 111 may include a second pattern group 111z not having an adjacent portion 111a. Referring to FIG. 10D and FIG. 10E, the concavo-convex pattern 111 may include a second pattern group 111z that is spaced apart from the sealing part 120 because the adjacent portion 111a is not provided.

Specifically, referring to FIG. 10D, the concavo-convex pattern 111 may be configured such that a first pattern group 111x having adjacent portions 111a at both end portions and a second pattern group 111z not having an adjacent portion 111a are repeated the same number of times (for example, three times) in the longitudinal direction.

Alternatively, referring to FIG. 10E, each of the concavo-convex pattern 111 may be configured such that a first pattern group 111y having an adjacent portion 111a at one end portion on one side of the width direction, a second pattern group 111z not having an adjacent portion 111a and a first pattern group 111y having an adjacent portion 111a at one end portion on the other side of the width direction is repeated the same number of times.

As described above, when the exterior material 100 or the electrochemical cell 10 according to the present disclosure is applied to a device by variously changing the presence or absence of the adjacent portion 111a, the concavo-convex pattern 111 may be designed in response to a local weak part. Further, by imparting a predetermined directionality to the position of the adjacent portion 111a, the exterior material 100 or the electrochemical cell 10 according to the present disclosure can be designed to enhance bending characteristics in a predetermined direction.

Meanwhile, FIG. 11 shows plan views and cross-sectional views of still other embodiments of the concavo-convex pattern 111 shown in FIG. 1. Hereinafter, various embodiments of the concavo-convex pattern 111 and the overlap area 121a will be described with reference to FIG. 11.

Referring to FIG. 11, the concavo-convex pattern 111 of the exterior material 100 provided in the present embodiment may include a concave pattern 111ca and a convex pattern 111cv. The concave pattern 111ca may be formed to be protruded toward the inner space of the accommodating part 110, i.e., toward the electrode assembly 200 to be accommodated therein. Also, the convex pattern 111cv is disposed between the two concave patterns 111ca and may be formed to be protruded in a direction opposite to the concave pattern 111ca.

Figures 11A, 11B, 11C:
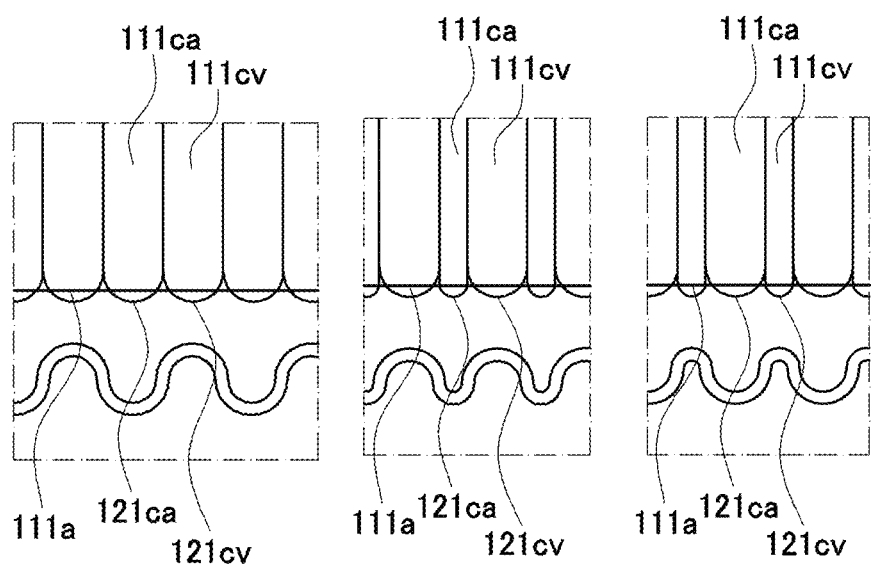
FIG. 11 shows plan views and cross-sectional views of still other embodiments of the concavo-convex pattern shown in FIG. 1.

Referring to FIG. 11, the concave pattern 111ca and the convex pattern 111cv may have the same width or may have different widths in the longitudinal direction. Specifically, as shown in FIG. 11A, the concave pattern 111ca and the convex pattern 111cv may be formed to have the same width in a direction (longitudinal direction) in which the concavo-convex pattern 111 is repeated. Alternatively, as shown in FIG. 11B or FIG. 11C, the concave pattern 111ca may have a greater width than the convex pattern 111cv, or the convex pattern 111cv may have a greater width than the concave pattern 111ca.

As shown in FIG. 11, the overlap area 121a of the present embodiment may have different widths depending on the widths of the concave pattern 111ca and the convex pattern 111cv. When the convex pattern 111cv has a greater width than the concave pattern 111ca (FIG. 11B), an overlap area 121ca formed at an end portion of a concave pattern may be smaller than an overlap area 121cv formed at an end portion of a convex pattern. When the concave pattern 111ca has a greater width than the convex pattern 111cv (FIG. 11C), an overlap area 121cv formed at an end portion of a convex pattern may be smaller than an overlap area 121ca formed at an end portion of a concave pattern.

As described above, the concavo-convex pattern 111 and the overlap area 121a are formed to have different sizes for the concave pattern 111ca and the convex pattern 111cv, and, thus, the exterior material 100 and the electrochemical cell 10 according to the present embodiment may have further enhanced characteristics with respect to a specific bending direction. When the electrochemical cell 10 according to the present disclosure is applied to a wearable device, etc. and when durability against bending is required more in a predetermined direction than in other directions, the electrochemical cell 10 can be designed to satisfy the requirements without adding materials and increasing weight accordingly.

The exterior material 100 and the electrochemical cell 10 according to the present disclosure described above may be manufactured by securing the overlap area 121a. Hereinafter, a method of manufacturing the exterior material 100 according to the present disclosure will be described in detail.

The method of manufacturing the exterior material 100 according to the present disclosure may be a method of assembling the electrochemical cell 10 by processing the exterior material 100 and accommodating and sealing the electrode assembly 200. The method of manufacturing the exterior material 100 according to the present disclosure includes a forming the concavo-convex pattern 111 and a forming the sealing part 120. The forming the concavo-convex pattern 111 may be a deforming the exterior material 100 by pressing or the like, and the forming the sealing part 120 may be a bonding the exterior material 100 to accommodate the electrode assembly 200 therein.

In the forming the concavo-convex pattern 111, the concavo-convex pattern 111 extended in one direction (width direction) and repeated in a direction (longitudinal direction) intersecting with the one direction is formed in the exterior material 100. The concavo-convex pattern 111 is protruded or recessed in the thickness direction of the exterior material 100, and, thus, the exterior material 100 may be creased in the longitudinal direction.

In the forming the sealing part 120, the sealing part 120 is formed by overlapping and bonding two sealing surfaces of the exterior material 100. The sealing part 120 may be formed by bonding two sealing surfaces along four or three edges of the previously formed accommodating part 110.

Further, in the forming the sealing part 120 of the present disclosure, the overlap area 121a, which is a part of the concavo-convex pattern 111, may be coupled to overlap with the sealing part 120. The overlap area 121a may be an end portion of the concavo-convex pattern 111 in the one direction (width direction), and the overlap area 121a may overlap with the sealing part 120 so as to bond the two sealing surfaces. As a result, the overlap area 121a may be processed to form a part of the concavo-convex pattern 111 when the concavo-convex pattern 111 is formed and may be finally included in one area of the sealing part 120. Accordingly, the adjacent portion 111a may be formed between the overlap area 121a and the concavo-convex pattern 111.

More specifically, in the forming the concavo-convex pattern 111, the round portion 111b having a predetermined radius of curvature Rp may be formed at the end portion of the concavo-convex pattern 111 in the one direction. Further, in the forming the sealing part 120, at least a part of the round portion 111b may become an overlap area 121a included in the sealing part 120. In this case, the width Wp of the overlap area 121a in the one direction (width direction) may satisfy an equation of Rp/2≤Wp≤2Rp. Further, in the forming of the sealing part 120, the width Ws of the sealing part 120 and the width Wp of the overlap area 121a in the one direction may satisfy relational expressions of Ws−Wp≥1 mm and Wp≥0.1 mm.

As described above, according to the manufacturing method in which the overlap area 121a is processed together with the concavo-convex pattern 111 and then the overlap area 121a is bonded as being included in the sealing part 120, it is possible to suppress concentration of stress caused by bending between an end portion of the concavo-convex pattern 111 and the sealing parts 120. According to the manufacturing method according to the present disclosure, it is possible to exclude a vulnerable part to bending without adding cost and processes such as adding a separate material or reinforcing the exterior material 100.

The above description of the present disclosure is provided for the purpose of illustration, and it would be understood by a person with ordinary skill in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. An electrochemical cell, comprising:
    an electrode assembly including a plurality of electrodes;
    an exterior material including an accommodating part that accommodates the electrode assembly and a sealing part that seals the electrode assembly by bonding sealing surfaces along edges of the accommodating part; and
    an electrode lead connected to the electrode assembly and extended to be exposed to an outside, wherein
    the accommodating part includes a concavo-convex pattern that is extended in a width direction of the electrochemical cell and that repeats in a longitudinal direction of the electrochemical cell, and
    the sealing part includes an overlap area having an arc-shaped crease, which is formed by being protruded or recessed when the concavo-convex pattern is formed and then the bonding of the sealing surfaces.

2. The electrochemical cell of claim 1, wherein the overlap area has a pattern having a lower height in a thickness direction than the concavo-convex pattern.

3. The electrochemical cell of claim 1, wherein
    the concavo-convex pattern includes an adjacent portion at an end of the concavo-convex pattern in the width direction of the electrochemical cell, the adjacent portion configured to be a boundary line in contact with the sealing part, and
    the concavo-convex pattern further includes a round portion having a predetermined radius of curvature at each of both ends of the adjacent portion in the longitudinal direction.

4. The electrochemical cell of claim 3, wherein a width (Wp) of the overlap area in the width direction and a radius of curvature (Rp) of the round portion satisfy Equation 1:

$$Rp/2 \le Wp \le 2Rp. \qquad \text{[Equation 1]}$$

5. The electrochemical cell of claim 1, wherein
    the concavo-convex pattern includes an adjacent portion at an end of the concavo-convex pattern in the width direction of the electrochemical cell, the adjacent portion configured to be a boundary line in contact with the sealing part, and
    the concavo-convex pattern further includes a portion, in which the concavo-convex pattern tapers in the width direction, at each of both ends of the adjacent portion in the longitudinal direction.

6. The electrochemical cell of claim 5, wherein a width (Wp) of the overlap area in the width direction and a half (Rp) of a width of the concavo-convex pattern in the longitudinal direction satisfy Equation 1:

$$Rp/2 \le Wp \le 2Rp. \qquad \text{[Equation 1]}.$$

7. The electrochemical cell of claim 1, wherein a width (Ws) of the sealing part in the width direction and a width (Wp) of the overlap area in the width direction satisfy Equations 2 and 3:

$$Ws - Wp \ge 1 \text{ mm} \qquad \text{[Equation 2]}$$

$$Wp \ge 0.1 \text{ mm}. \qquad \text{[Equation 3]}$$

8. The electrochemical cell of claim 1, wherein the concavo-convex pattern includes:
    a first pattern group having the overlap area at one or both ends of the first pattern group in the width direction, and
    a second pattern group not having the overlap area.

9. The electrochemical cell of claim 1, wherein the concavo-convex pattern includes:
    a concave pattern that is formed to be protruded toward an inner space of the accommodating part; and
    a convex pattern that is disposed adjacent to the concave pattern, has a different thickness from the concave pattern in the longitudinal direction, and is protruded in a direction opposite to the concave pattern.

10. A method of manufacturing an electrochemical cell including an electrode assembly sealed within an exterior material, comprising:

forming a concavo-convex pattern in the exterior material, the concavo-convex pattern extended in a width direction of the electrochemical cell and that repeats in a longitudinal direction of the electrochemical cell; and forming a sealing part by overlapping and bonding two sealing surfaces of the exterior material, the sealing part including an overlap area with an arc-shaped crease, wherein in the forming the sealing part, a part of the concavo-convex pattern is formed into the arc-shaped crease by the bonding of the two sealing surfaces.

11. The method of manufacturing an electrochemical cell of claim 10, wherein in the forming the concavo-convex pattern, a round portion having a predetermined radius of curvature (Rp) is formed at an end of the concavo-convex pattern in the width direction, and in the forming the sealing part, at least a part of the round portion is included in the overlap area, and a width (Wp) of the overlap area in the width direction satisfies Equation 1:

$Rp/2 \leq Wp \leq 2Rp.$ [Equation 1].

12. The method of manufacturing an electrochemical cell of claim 10, wherein in the forming the concavo-convex pattern, a portion, in which a width (2Rp) of the concavo-convex pattern tapers in the width direction, is formed at ends of the concavo-convex pattern in the width direction, in the forming the sealing part, at least a part of the portion, of which a width is tapered, is included in the overlap area, and a width (Wp) of the overlap area in the one direction satisfies Equation 1:

$Rp/2 \leq Wp \leq 2Rp.$ [Equation 1].

13. The method of manufacturing an electrochemical cell of claim 10, $Ws - Wp \geq 1$ mm [Equation 2]

$Wp \geq 0.1$ mm. [Equation 3]

14. An exterior material that seals an electrode assembly, comprising:

an accommodating part that accommodates the electrode assembly and includes a concavo-convex pattern extended in a width direction of the electrode assembly and that repeats in a longitudinal direction of the electrode assembly; and a sealing part that is formed by bonding two sealing surfaces along edges of the accommodating part, wherein the sealing part includes an overlap area having an arc-shaped crease, which is formed by being protruded or recessed when the concavo-convex pattern is formed and then the bonding of the sealing surfaces.

* * * * *